(12) United States Patent
Oh et al.

(10) Patent No.: US 10,840,821 B2
(45) Date of Patent: Nov. 17, 2020

(54) MODULAR MULTI-LEVEL CONVERTER

(71) Applicant: HYOSUNG HEAVY INDUSTRIES CORPORATION, Seoul (KR)

(72) Inventors: Sung Min Oh, Seoul (KR); Jun Chol Lee, Gunpo-si (KR); Joo Yeon Lee, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/473,449

(22) PCT Filed: Dec. 5, 2017

(86) PCT No.: PCT/KR2017/014129
§ 371 (c)(1),
(2) Date: Jun. 25, 2019

(87) PCT Pub. No.: WO2018/124516
PCT Pub. Date: Jul. 5, 2018

(65) Prior Publication Data
US 2020/0153358 A1    May 14, 2020

(30) Foreign Application Priority Data
Dec. 26, 2016    (KR) .................. 10-2016-0179556

(51) Int. Cl.
*H02M 7/483*    (2007.01)
*H02J 3/18*    (2006.01)
(Continued)

(52) U.S. Cl.
CPC .............. *H02M 7/483* (2013.01); *H02J 3/18* (2013.01); *H02J 3/36* (2013.01); *H02M 1/32* (2013.01);
(Continued)

(58) Field of Classification Search
CPC ......... H02M 2001/0006; H02M 7/483; H02M 1/32; H02M 7/5387; H02M 2007/4835; H02J 3/18; H02J 3/36
See application file for complete search history.

(56) References Cited

U.S. PATENT DOCUMENTS

2015/0357906 A1* 12/2015 Jung .................. H02M 1/00
                                                363/56.03
2018/0091037 A1*  3/2018 Zhao ................. H02M 1/10
2019/0028038 A1*  1/2019 Alvarez Valenzuela .....................
                                                H02M 7/5387

FOREIGN PATENT DOCUMENTS

JP        2011-193615 A    9/2011
JP        2014-082809 A    5/2014
(Continued)

*Primary Examiner* — Alex Torres-Rivera
(74) *Attorney, Agent, or Firm* — Novick, Kim & Lee, PLLC; Jae Yeon Kim

(57) ABSTRACT

A modular multilevel converter (MMC) converter including an auxiliary sub-module provided between an upper converter arm and a lower converter arm of the MMC converter is provided. An MMC converter includes an auxiliary sub-module including: an energy storage unit storing a DC voltage in the sub-module; a first semiconductor switch connected to the energy storage unit; a second semiconductor switch connected to the first semiconductor switch; a third semiconductor switch connected to the second semiconductor switch; and a switching controller turning ON/OFF the first to third semiconductor switches, wherein a mid-point between the first and second semiconductor switches is connected to the sub-module of the upper converter arm, a mid-point between the second and third semiconductor switches is connected to a load connection terminal, and a mid-point between the third semiconductor switch and the energy storage unit is connected to the sub-module of the lower converter arm.

6 Claims, 4 Drawing Sheets

(51) Int. Cl.
*H02J 3/36* (2006.01)
*H02M 1/32* (2007.01)
*H02M 7/5387* (2007.01)
*H02M 1/00* (2006.01)

(52) U.S. Cl.
CPC .. *H02M 7/5387* (2013.01); *H02M 2001/0006* (2013.01); *H02M 2007/4835* (2013.01)

(56) References Cited

FOREIGN PATENT DOCUMENTS

| | | | |
|---|---|---|---|
| JP | 5843976 | B2 | 1/2016 |
| KR | 10-2016-0080016 | A | 7/2016 |
| KR | 10-2016-0080021 | A | 7/2016 |
| KR | 10-1668431 | B1 | 10/2016 |

\* cited by examiner

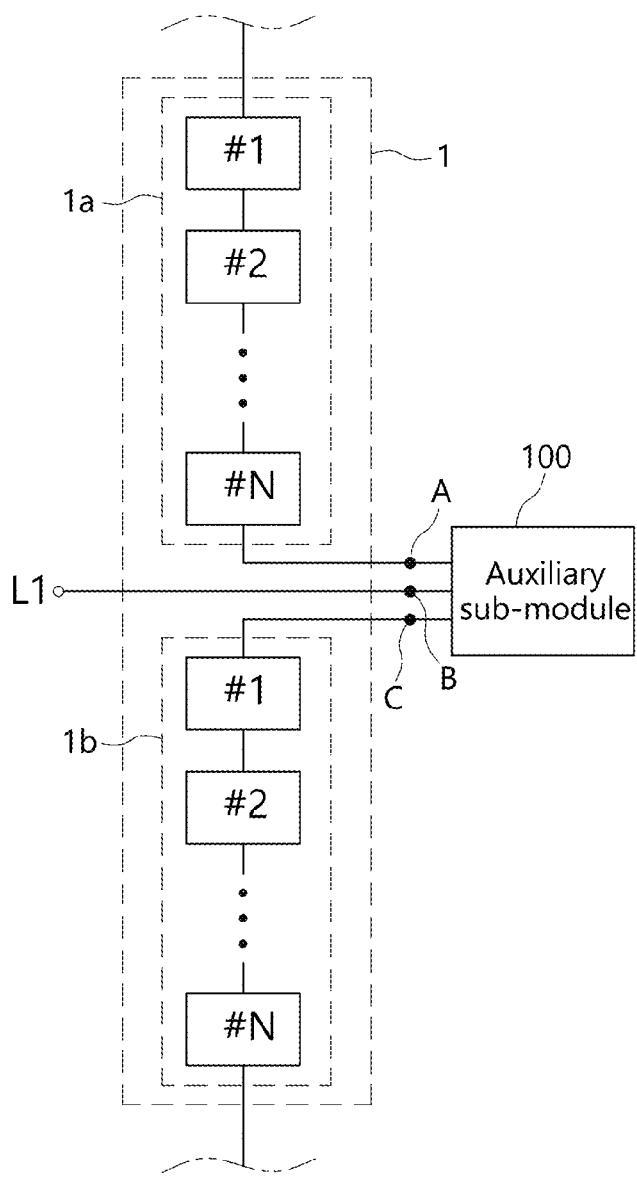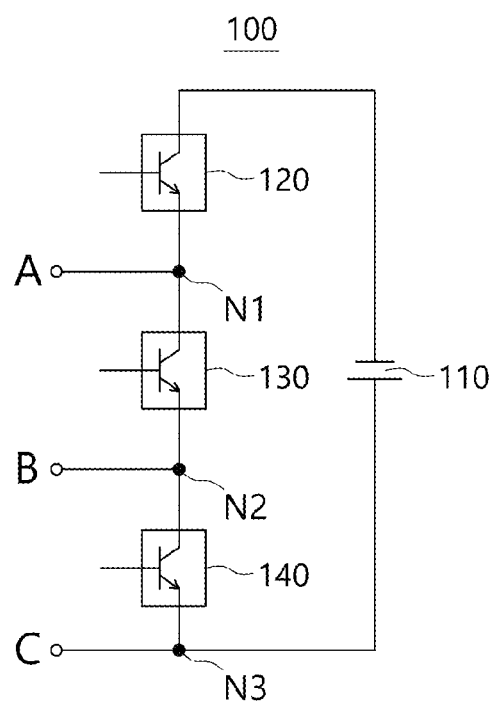
FIG. 2(a)
FIG. 2(b)

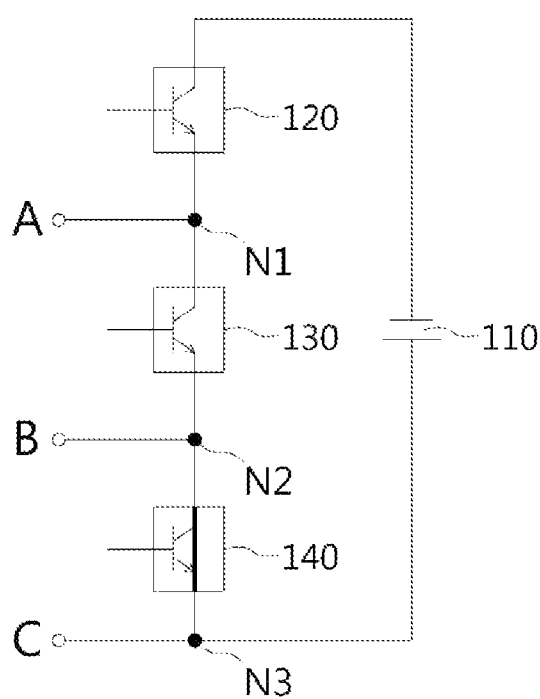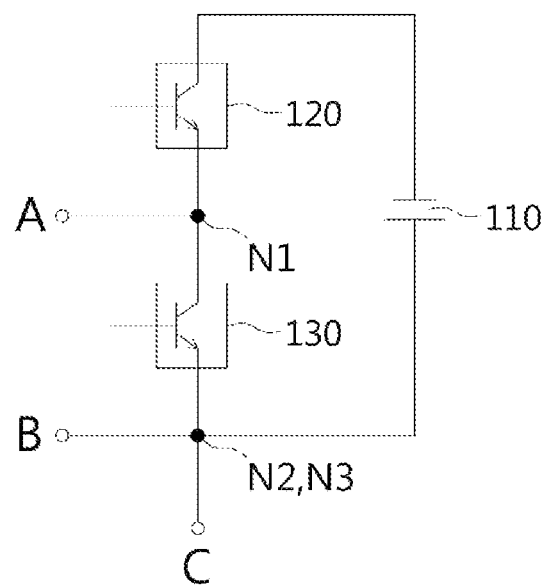
FIG. 3(a)                    FIG. 3(b)

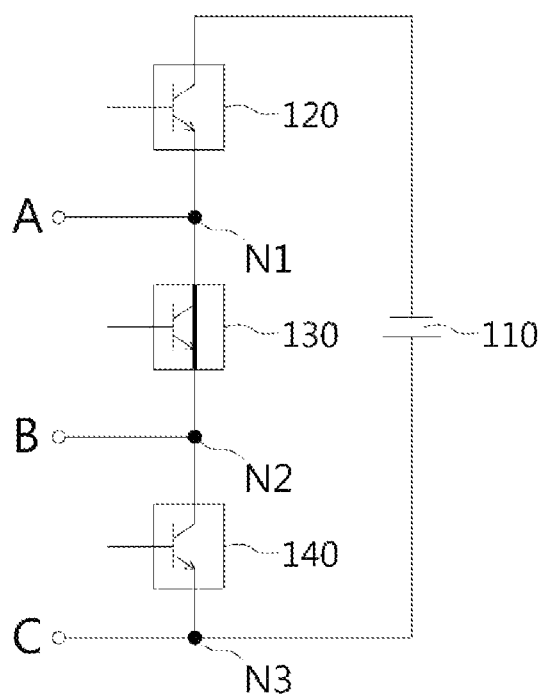 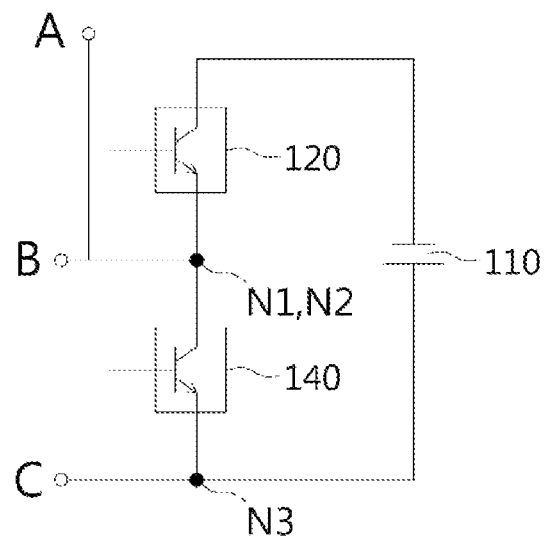
FIG. 4(a)　　　　FIG. 4(b)

MODULAR MULTI-LEVEL CONVERTER

TECHNICAL FIELD

The present invention relates to a modular multilevel converter (MMC). More particularly, the present invention relates to an MMC converter including an auxiliary sub-module provided between an upper converter arm and a lower converter arm of the MMC converter and which may be used in common in the upper converter arm and the lower converter arm.

BACKGROUND ART

Generally, in high voltage direct current (HVDC) systems, alternating current (AC) power produced in a power plant is converted into DC power and then the DC power is transmitted, and a power receiving stage re-converts the DC power into AC power and supplies the same to a load. The above HVDC system is advantageous in that power may be efficiently and economically transmitted through voltage boosting, and in that connections between heterogeneous systems and long-distance high-efficiency power transmission are possible.

In addition, a static synchronous compensator (STATCOM) is a kind of flexible AC transmission system (FACTS) device, and refers to an electric power electronics-based compensator, which is used to increase power transmission capacity and to maximize the usage of existing facilities. The above STATCOM system is advantageous in that power systems are compensated in parallel by using a voltage-type power semiconductor device, thus stabilizing the systems by maintaining the voltage at a constant value.

An MMC converter may be connected to an HVDC or STATCOM system.

A conventional MMC converter is configured, as shown in FIG. 1, with at least one phase module 1, and each phase module 1 is configured with N series-connected sub-modules 10 respectively including two output terminals X1 and X2. Load connection terminals L1, L2, and L3 may be connected to a three-phase load, for example, three-phase AC system.

Each phase module 1 is divided into an upper converter arm 1a and a lower converter arm 1b based on the load connection terminal L1, L2, and L3.

Each sub-module 10 is configured with two power semiconductor devices which are formed in a half bridge form, and an energy storage unit connected in parallel to the power semiconductor devices.

In the above conventional MMC converter, an auxiliary sub-module 20 having a form identical to the sub-module 10 is provided in the upper converter arm 1a and in the lower converter arm 1b, and when a failure occurs in the sub-module in operation, the same is replaced with the auxiliary sub-module 20.

A structure of the above conventional auxiliary sub-module 20 cannot be commonly applied to the upper converter arm 1a and the lower converter arm 1b, and thus the auxiliary sub-module 20 is provided to each of the upper converter arm 1a and the lower converter arm 1b.

DISCLOSURE

Technical Problem

Accordingly, an objective of the present invention is to provide an MMC converter including an auxiliary sub-module that is commonly used in an upper converter arm and a lower converter arm of the MMC converter.

Technical Solution

According to the present invention, an MMC converter includes: upper and lower converter arms respectively configured with a plurality of series-connected sub-modules, and an auxiliary sub-module provided between the upper and lower converter arms, the auxiliary sub-module including: an energy storage unit for storing a DC voltage inside the sub-module; a first semiconductor switch connected in parallel to the energy storage unit; a second semiconductor switch connected in series to the first semiconductor switch; a third semiconductor switch connected in series to the second semiconductor switch; and a switching controller turning ON/OFF the first to third semiconductor switches, wherein a mid-point N1 between the first semiconductor switch and the second semiconductor switch is connected to the sub-module of the upper converter arm, a mid-point N2 between the second semiconductor switch and the third semiconductor switch is connected to a load connection terminal of the MMC converter, and a mid-point N3 between the third semiconductor switch and the energy storage unit is connected to the sub-module of the lower converter arm.

In the present invention, when failure occurs in one of the plurality of sub-modules included in the upper converter arm, the switching controller may use the auxiliary sub-module as the sub-module of the upper converter arm by maintaining the third semiconductor switch in an ON state, and turning ON/OFF the first semiconductor switch and the second semiconductor switch.

In the present invention, when failure occurs in one of the plurality of sub-modules included in the lower converter arm, the switching controller may use the auxiliary sub-module as the sub-module of the lower converter arm by maintaining the second semiconductor switch in an ON state, and turning ON/OFF the first semiconductor switch and the third semiconductor switch.

In the present invention, the mid-point N1 may be connected to one of two terminals of a lowest sub-module of the upper converter arm.

In the present invention, the mid-point N3 is connected to one of two terminals of an uppermost sub-module of the lower converter arm.

Advantageous Effects

As described above, according to the present invention, a circuit structure can be simplified, the cost of the same can be reduced, and a reliability of the MMC converter can be improved by applying one auxiliary sub-module that may be used in common in upper and lower converter arms rather than applying, conventionally, at least two auxiliary sub-modules to the upper and lower converter arms.

DESCRIPTION OF DRAWINGS

FIGS. 2(a) and 2(b) are views of a circuit diagram showing an MMC converter and an auxiliary sub-module according to an embodiment of the present invention.

FIGS. 3(a) and 3(b) are views of a circuit diagram when the auxiliary sub-module according to an embodiment of the present invention is applied to an upper converter arm.

FIGS. 4(a) and 4(b) are views of a circuit diagram when the auxiliary sub-module according to an embodiment of the present invention is applied to a lower converter arm.

BEST MODE

Figure 1:
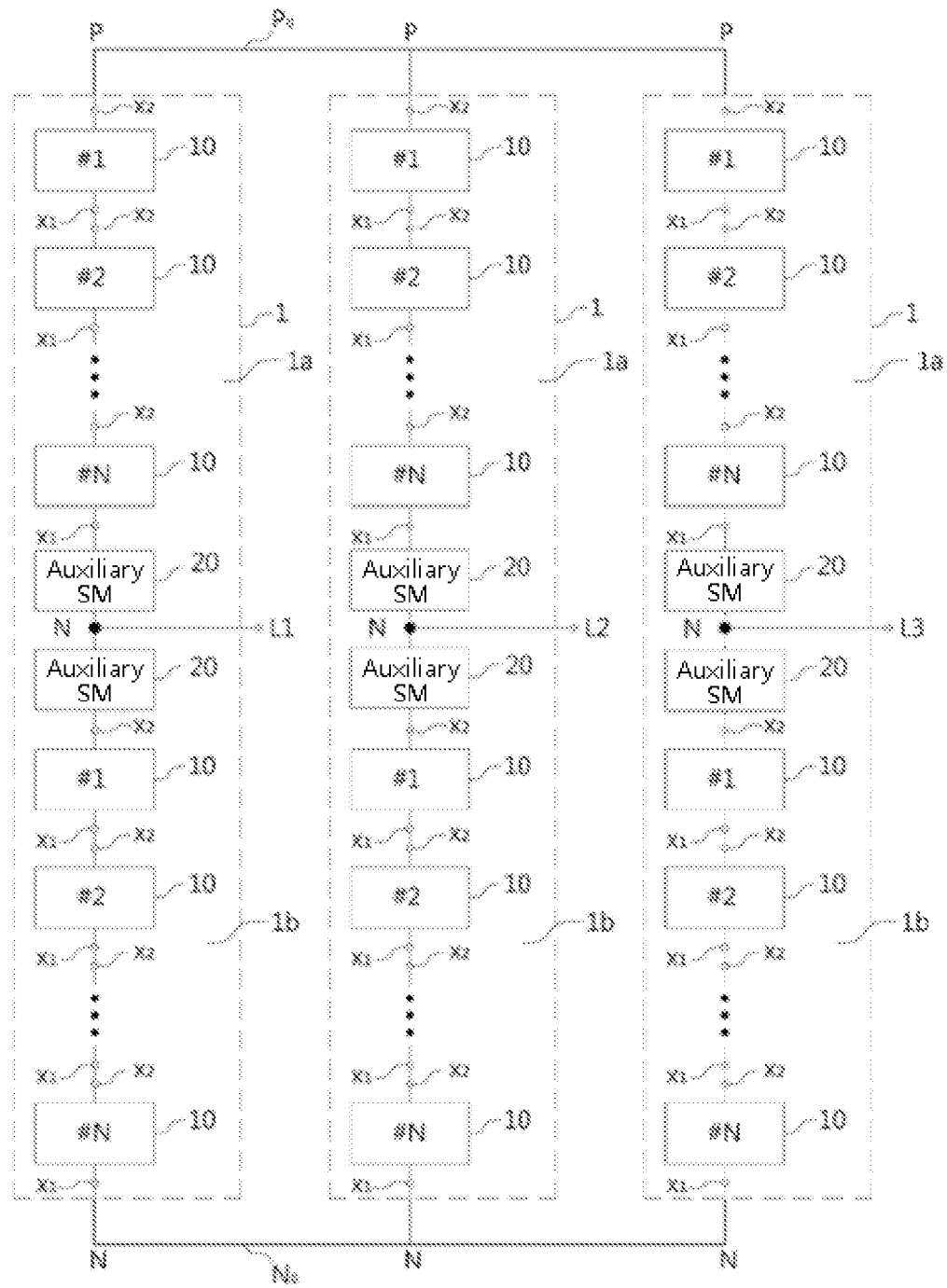
FIG. 1 is a view showing an equivalent circuit diagram of a conventional MMC converter.

Hereinafter, preferred embodiments of the present invention will be described with reference to the accompanying drawings. In addition, in the following description of the present invention, when it is determined that a detailed description of a related well-known function or element may make the gist of the present invention unnecessarily vague, the detailed description will be omitted.

FIGS. 2(a) and 2(b) are views of a circuit diagram showing an MMC converter and an auxiliary sub-module according to an embodiment of the present invention.

First, in FIG. 2(a), a phase module 1 of an MMC converter according to an embodiment of the present invention is shown. Referring to FIG. 2(a), the phase module 1 of the MMC converter is configured with an upper converter arm 1a and a lower converter arm 1b, wherein each converter arm is configured with N series-connected sub-modules 10. An auxiliary sub-module 100 is provided between the upper converter arm 1a and the lower converter arm 1b.

The auxiliary sub-module 100 includes three terminals A, B, and C, the first terminal A is connected in series to an N-th sub-module 10 that is the lowest sub-module 10 of the upper converter arm 1a, and the second terminal B is connected to a load connection terminal L1 (or L2, L3)) of the MMC converter. The third terminal C is connected in series to the first sub-module 10 that is the uppermost sub-module 10 of the lower converter arm 1b. Hereinafter, for convenience of description, connection to terminal L1 will be described.

In other words, the auxiliary sub-module 100 is connected between the upper converter arm 1a and the lower converter arm 1b and to the load connection terminal L1.

A switching controller (not shown) controls the above auxiliary sub-module 100 by controlling a semiconductor switch provided in the auxiliary sub-module 100.

A detailed circuit of the auxiliary sub-module 100 is shown in FIG. 2(b).

Referring to FIG. 2(b), the auxiliary sub-module 100 is configured with an energy storage unit 110 and three semiconductor switches 120, 130, and 140.

A first semiconductor switch 120, a second semiconductor switch 130, and a third semiconductor switch 140 are connected in series with each other, and connected to the energy storage unit 110 in parallel.

The energy storage unit 110 is configured to store a DC voltage stored within the auxiliary sub-module 100, and the three semiconductor switches 120, 130, and 140 are switching elements switching the current flow, and may be implemented by using, for example, an IGBT, a FET, a transistor, etc.

The three semiconductor switches 120, 130, and 140 are turned ON/OFF by a control signal of the switching controller (not shown) of the MMC converter.

In addition, a mid-point N1 between the first semiconductor switch 120 and the second semiconductor switch 130 is connected to the first terminal A of the auxiliary sub-module 100, and connected in series to the lowest sub-module 10 of the upper converter arm 1a of the MMC converter.

A mid-point N2 between the second semiconductor switch 130 and the third semiconductor switch 140 is connected to the second terminal B of the auxiliary sub-module 100, and connected to the load connection terminal L1 of the MMC converter.

Finally, a mid-point N3 between the third semiconductor switch 140 and the energy storage unit 110 is connected to the third terminal C of the auxiliary sub-module 100, and connected in series to the uppermost sub-module 10 of the lower converter arm 1b of the MMC converter.

The auxiliary sub-module 100 having the above structure is replaced with the sub-module 10 of a half-bridge form which is provided in the upper converter arm 1a or lower converter arm 1b when failure occurs in the same.

However, the structure of the auxiliary sub-module 100 is not a half-bridge form, and the auxiliary sub-module 100 becomes the sub-module 10 of a half-bridge form by properly controlling the three semiconductor switches 120, 130, and 140, and thus the same may be replaced with the sub-module 10 of the upper converter arm 1a or lower converter arm 1b.

Operations when the auxiliary sub-module 100 is applied to the upper or lower converter arm 1a or 1b will be described in detail with reference to FIGS. 3 and 4.

FIGS. 3(a) and 3(b) are views of a circuit diagram when the auxiliary sub-module according to an embodiment of the present invention is applied to an upper converter arm.

FIGS. 3(a) and 3(b) show a control operation and an equivalent circuit of the auxiliary sub-module 100 when failure occurs in one sub-module 10 among a plurality of sub-modules 10 included in the of the upper converter arm 1a of the MMC converter.

Referring to FIG. 3(a), when failure occurs in the sub-module 10 of the upper converter arm 1a, the switching controller maintains the third semiconductor switch 140 of the auxiliary sub-module 100 in an ON state such that a short state is established between the mid-points N2 and N3.

An equivalent circuit of the above state is shown in FIG. 3(b).

Referring to FIG. 3(b), the mid-points N2 and N3 are represented in the same point as a short state is established between the mid-points N2 and N3 by the ON state of the third semiconductor switch 140, and the auxiliary sub-module 100 becomes a circuit of a half-bridge form including the first semiconductor switch 120, the second semiconductor switch 130, and the energy storage unit 110.

In addition, the mid-point N1 is connected to the terminal A that is connected in series to the lowest sub-module 10 of the upper converter arm 1a, the mid-points N2 and N3 are connected to the terminal B that is connected to the uppermost sub-module 10 of the lower converter arm 1b, and to the terminal C that is connected to the load connection terminal of the MMC converter, and thus the auxiliary sub-module 100 substantially operates as the lowest sub-module of the upper converter arm 1a.

In other words, the switching controller turns ON/OFF the first semiconductor switch 120 and the second semiconductor switch 130 while maintaining the third semiconductor switch 140 in an ON state such that the auxiliary sub-module 100 operates as the lowest sub-module of the upper converter arm 1a.

FIGS. 4(a) and 4(b) are views of a circuit diagram when the auxiliary sub-module according to an embodiment of the present invention is applied to a lower converter arm.

FIGS. 4(a) and 4(b) show a control operation and an equivalent circuit of the auxiliary sub-module 100 when failure occurs in one sub-module 10 among a plurality of sub-modules 10 included in the of the lower converter arm 1b of the MMC converter.

Referring to FIG. 4(a), when failure occurs in the sub-module 10 of the lower converter arm 1b, the switching controller maintains the second semiconductor switch 130 of the auxiliary sub-module 100 in an ON state such that a short state is established between the mid-points N1 and N2.

An equivalent circuit of the above state is shown in FIG. 4(b).

Referring to FIG. 4(b), the mid-points N1 and N2 are represented in the same point as a short state is established between the mid-points N1 and N2 by the ON state of the second semiconductor switch 130, and the auxiliary sub-module 100 becomes a circuit of a half-bridge including the first semiconductor switch 120, the third semiconductor switch 140, and the energy storage unit 110.

In addition, the mid-points N1 and N2 are connected to the terminal A that is connected in series to the lowest sub-module 10 of the upper converter arm 1a and to the terminal B that is connected to the load connection terminal of the MMC converter, and the mid-point N3 is connected to the terminal C that is connected to the uppermost sub-module 10 of the lower converter arm 1b, thus the auxiliary sub-module 100 substantially operates as the uppermost sub-module of the lower converter arm 1b.

In other words, the switching controller turns ON/OFF the first semiconductor switch 120 and the third semiconductor switch 140 while maintaining the second semiconductor switch 130 in an ON state such that the auxiliary sub-module 100 operates as the uppermost sub-module of the lower converter arm 1b.

As described above, a structure of an alternative sub-module that may be applied to upper or lower converter arm 1a or 1b may be employed by using one auxiliary sub-module 100 while the switching controller maintains some of the switching semiconductors of the auxiliary sub-module 100 in an ON state.

As described above, in the present invention, there is provided an auxiliary sub-module that may be applied in common between an upper converter arm and a lower converter arm of MMC converter, and when failure occurs in a sub-module constituting the upper or lower converter arm, the same can be replaced with the auxiliary sub-module by maintaining one of three semiconductor switches provided in the auxiliary sub-module in an ON state and the controlling the remaining two semiconductor switches.

Although the present invention has been described in detail via the preferred embodiments, it should be noted that the present invention is not limited to the embodiments. It will be readily apparent to those having ordinary knowledge in the technical field to which the present invention pertains that various changes and modifications, which are not presented in the embodiments, can be made to the present invention within the scope of the attached claims and fall within the range of technical protection of the present invention. Accordingly, the scope of the disclosure is not to be limited by the above aspects but by the claims and the equivalents thereof.

The invention claimed is:

1. A modular multi-level converter (MMC), comprising upper and lower converter arms respectively including a plurality of series-connected sub-modules, and an auxiliary sub-module provided between the upper and lower converter arms, wherein the auxiliary sub-module comprises:
    an energy storage unit storing a DC voltage in the sub-module;
    a first semiconductor switch connected in parallel to the energy storage unit;
    a second semiconductor switch connected in series to the first semiconductor switch;
    a third semiconductor switch connected in series to the second semiconductor switch; and
    a switching controller turning ON/OFF the first to third semiconductor switches, and
    wherein a mid-point (N1) between the first semiconductor switch and the second semiconductor switch is connected to the sub-module of the upper converter arm, a mid-point (N2) between the second semiconductor switch and the third semiconductor switch is connected to a load connection terminal of the MMC converter, and a mid-point (N3) between the third semiconductor switch and the energy storage unit is connected to the sub-module of the lower converter arm,
    wherein when failure occurs in one of the plurality of sub-modules included in the upper converter arm, the switching controller uses the auxiliary sub-module as the sub-module of the upper converter arm by maintaining the third semiconductor switch in an ON state, and turning ON/OFF the first semiconductor switch and the second semiconductor switch.

2. The MMC of claim 1, wherein the mid-point (N1) is connected to one of two terminals of a lowest sub-module of the upper converter arm.

3. The MMC of claim 1, wherein the mid-point (N3) is connected to one of two terminals of an uppermost sub-module of the lower converter arm.

4. A modular multi-level converter (MMC), comprising upper and lower converter arms respectively including a plurality of series-connected sub-modules, and an auxiliary sub-module provided between the upper and lower converter arms, wherein the auxiliary sub-module comprises:
    an energy storage unit storing a DC voltage in the sub-module;
    a first semiconductor switch connected in parallel to the energy storage unit;
    a second semiconductor switch connected in series to the first semiconductor switch;
    a third semiconductor switch connected in series to the second semiconductor switch; and
    a switching controller turning ON/OFF the first to third semiconductor switches, and
    wherein a mid-point (N1) between the first semiconductor switch and the second semiconductor switch is connected to the sub-module of the upper converter arm, a mid-point (N2) between the second semiconductor switch and the third semiconductor switch is connected to a load connection terminal of the MMC converter, and a mid-point (N3) between the third semiconductor switch and the energy storage unit is connected to the sub-module of the lower converter arm,
    wherein when failure occurs in one of the plurality of sub-modules included in the lower converter arm, the switching controller uses the auxiliary sub-module as the sub-module of the lower converter arm by maintaining the second semiconductor switch in an ON state, and turning ON/OFF the first semiconductor switch and the third semiconductor switch.

5. The MMC of claim 4, wherein the mid-point (N1) is connected to one of two terminals of a lowest sub-module of the upper converter arm.

6. The MMC of claim 4, wherein the mid-point (N3) is connected to one of two terminals of an uppermost sub-module of the lower converter arm.

* * * * *